June 8, 1954 W. W. GLEASON 2,680,253
SPRING ASSEMBLY UNIT
Filed July 28, 1950 2 Sheets-Sheet 1
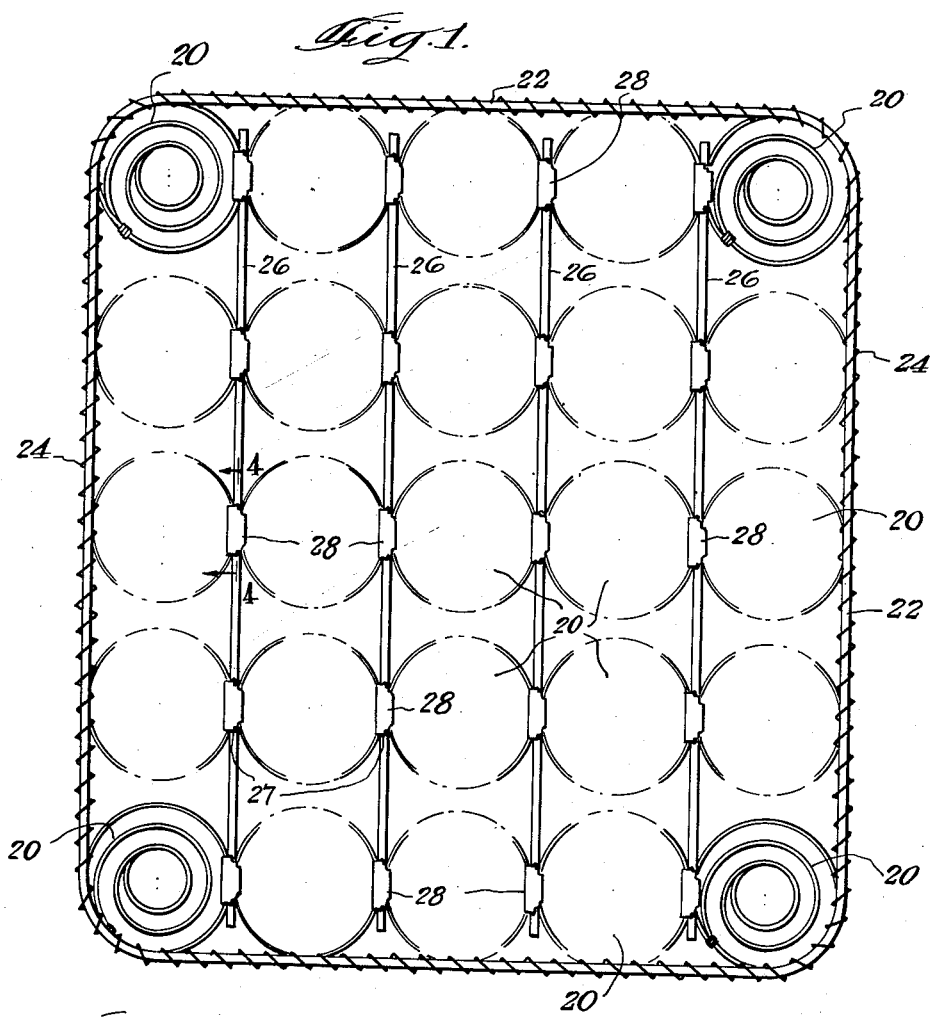
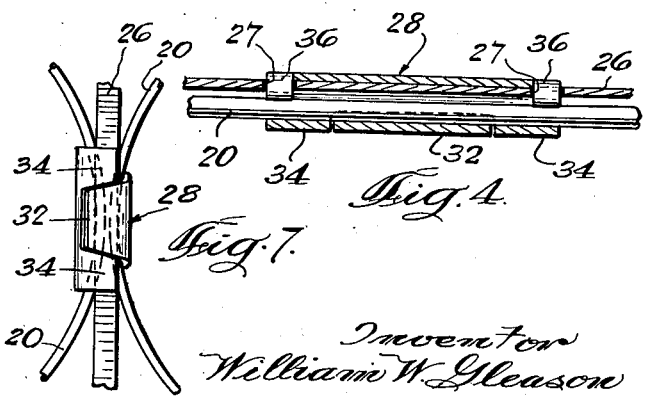
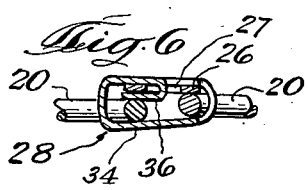

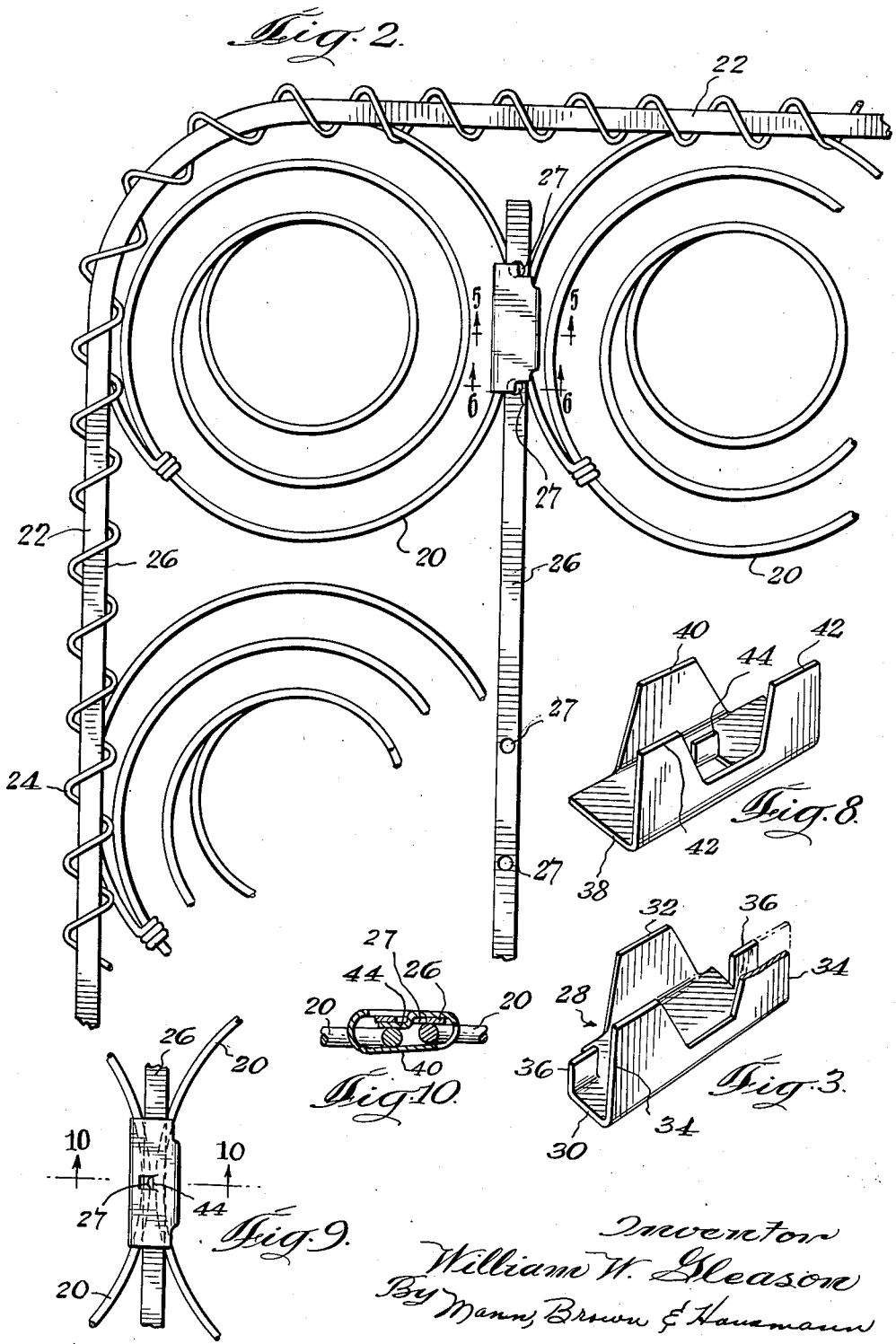

Patented June 8, 1954

2,680,253

UNITED STATES PATENT OFFICE 2,680,253

SPRING ASSEMBLY UNIT

William W. Gleason, Chicago, Ill., assignor to Nachman Corporation, Chicago, Ill., a corporation of Illinois Application July 28, 1950, Serial No. 176,293

4 Claims. (Cl. 5—267)

This invention relates to spring assembly units of the kind used in mattresses, upholstery, and the like, and more particularly to improved means for securing the springs together and in their aligned position.

One of the objects of my invention is the provision of a spring assembly unit in which pressure applied at any one point in the unit is resisted through substantially the spring assembly unit, thus giving greater resiliency to the unit as a whole.

Another of the objects of my invention is the provision of a spring assembly unit which, when subjected to the usual deformation and lateral stresses, will resume its original shape.

Another object of my invention is to provide a spring assembly unit in which the individual springs are prevented from overlapping each other, thereby reducing noise and wear resulting from the usual continuous frictional engagement of the springs upon distortion of the unit.

Another object of my invention is the provision of means to secure the springs to tie rods in such a way as to prevent movement of the springs with respect to the tie rods.

Another object of my invention is the provision of novel clip means whereby the clip is held rigidly to the tie rod, preventing the movement of the clip with respect to the tie rod.

These and other objects, advantages and capabilities of the invention will become apparent from the following description wherein reference is had to the accompanying drawings in which:

Fig. 1 is a top plan view of my improved spring assembly unit;

Fig. 2 is an enlarged top plan view of a corner portion of the spring assembly unit shown in Fig. 1;

Fig. 3 is a perspective view, with one portion broken away, showing one form of clip used in my improved spring assembly unit;

Fig. 4 is a cross-sectional view through the clip of Fig. 3 and the tie rod, taken along the line 4—4 of Fig. 1;

Fig. 5 is a sectional view through the clip, tie rod and springs, taken along the line 5—5 of Fig. 2 and looking in the direction of the arrows;

Fig. 6 is a cross-sectional view similar to Fig. 5, but taken along the line 6—6 of Fig. 2;

Fig. 7 is a bottom plan view showing a clip secured to the tie rod and springs;

Fig. 8 is a perspective view of another form of clip used in my improved spring assembly unit;

Fig. 9 is a top plan view showing the clip of Fig. 8 securing the springs and the tie rod together; and Fig. 10 is a sectional view taken along the line 10—10 of Fig. 9.

As shown in Figs. 1 and 2, a plurality of coil springs 20 are positioned within a flat border wire 22. This flat border wire is placed in overlapping relation with the terminal coils of the marginal springs 20. The marginal springs 20 are secured to the flat border wire frame by means of a helical wire 24, as described more fully in Patent No. 2,124,695 covering my invention entitled "Spring Assembly."

Tie rods 26 of flat wire, corresponding substantially in dimension with the border wire and having openings 27, are placed in parallel relationship to opposite sides of the border frame, and, as shown in Figs. 5 and 6, overlap the terminal coils of springs of adjacent rows. These tie rods are of a length less than the length of one side of the border frame but are sufficiently long to overlap a small arc of the inner edge of the marginal springs secured to one side of the border wire without being in contact with or secured to the border wire. The tie rods 26 are rigidly secured to the springs 20 by means of clips 28 in such a way as to prevent any movement of the springs with respect to the tie rod. These clips may take the form of the clips shown in Figs. 3 and 8.

The clip shown in Fig. 3 is a one-piece metal clip formed in a single blanking operation. The clip, in its original shape, has a base portion 30 and sides 32 and 34 extending upwardly perpendicular to the base portion. The side 34 has a recess or indented portion conforming generally in shape to the side 32. This recessed portion of the side 34 is adapted to receive the side 32 when the clip is in its fully clamped position. At opposite sides of the base portion 30 of the clip shown in Fig. 3 are lugs 36 integral with and formed from the base portion and extending upwardly perpendicular to the base portion 30. These lugs are of a length sufficient to extend through the openings 27 in the tie rods 26, and, when bent, to envelop a portion of the tie rod.

The clip shown in Fig. 8 is similar to the clip shown in Fig. 3, in that this clip has a base portion 38 and side portion 42 extending upwardly from the base portion and having a recessed portion adapted to receive the opposite side 40 when the clip is in its fully clamped position. The clip of Fig. 8 has a single lug 44 integral with and formed from the base portion 38, which lug is positioned approximately midway between the sides 40 and 42 and centrally of the ends of the base portion 38. This lug likewise is adapted to be received in the openings 27 of the tie rods 26.

In the assembly of my improved spring unit, one row of coil springs is placed in position with the springs spaced apart a distance depending upon the type of use to which the spring unit is to be put and the amount of resiliency to be provided. The number of springs in a row will depend upon the desired size of the completed unit and the distance between the terminal coils of the spring. A second row of springs is then placed parallel to the first row such that the edges of the terminal coils of the springs of the second row are spaced slightly from the inner edges of the terminal coils of the first row. Tie rods 26 are then placed in overlapping relationship with the terminal coils of the springs of the two rows. The openings 27 in the tie rods 26 are preformed and the distance between the openings will be determined by the size of the springs used, the distance between the springs in any one row, and the type of clip to be used. Appropriate tie rods, as shown in Fig. 2, with preformed openings for the clip shown in Fig. 3, will, when placed in position on the two rows of springs, have openings on each side of the point where the arcs of the terminal coils of adjacent springs are closest together. Tie rods for use with the clips shown in Fig. 8 will have openings, as shown in Fig. 10, at the point where the arcs of the terminal coils of adjacent springs are closest together.

After the tie rods are placed in position over the two rows of springs, clips are placed in position on the tie rods with the lugs 36 and 44 being received into the openings 27 and the sides of the clips extending downwardly beyond the terminal coils of the springs and the tie rods. The springs are then depressed slightly and the lugs of the clips are bent to one side or the other, as shown in Figs. 6 and 10, to envelop a portion of the tie rod between the lugs and the base portions 30 and 38.

The springs are then returned to their normal position within the depending sides of the clip and the sides 32, 34, and 40, 42, are bent toward each other and are wrapped around the tie rods and the terminal coils of adjacent springs. As shown in Fig. 7, the recessed portion of one side of the clips of Figs. 3 and 8 is adapted to receive the opposite side of the clip when it is in fully clamped position, thus presenting a smooth surface to the under side of the clip. With this construction it is apparent that when the clip is in its fully clamped position the springs and the clip are prevented from moving along the length of the tie rod and the adjacent springs being snugly enveloped by the clip are prevented from buckling or overlapping each other.

After the first two rows of springs have been clamped together as described above, succeeding rows of springs are placed in position and clamped to the initial structure in the same manner until the unit has the desired width. Border frames are then placed in position around the periphery of the unit and secured to the marginal springs by means of the helical coiled wire 24. After the top of the unit has thus been secured together, the whole unit may be turned over and the same procedure followed to secure the coils at the bottom of the unit.

It will thus be seen that I have devised a spring assembly unit in which the individual springs comprising the unit are tied together by means of a border frame, tie rods and improved clips, and in which assembly pressures exerted vertically, laterally, or both, at any one point may be resisted over a wide area of the assembly.

While I have illustrated and described a preferred embodiment of my invention, many modifications may be made without departing from the spirit of the invention, and I do not wish to be limited to the precise details set forth but desire to avail myself of all changes within the scope of the appended claims.

I claim:

1. In a spring assembly, the combination of a plurality of coil springs aligned in crosswise and lengthwise rows with the terminal coils in the crosswise rows in close side-by-side relation, tie rods in the form of an elongate flat strip of metal extending lengthwise between the rows in overlapping relation with adjacent edge portions of terminal coils on one side thereof and having openings therethrough in said overlapping portions, and clips securing the tie rods to the coil springs to prevent relative displacement, including a base portion dimensioned to extend crosswise of the strip, lugs integral with the base portion and extending through the openings in the strip and bent to engage the opposite wall thereof, and side walls integral with the lateral edges of said base extending perpendicularly therefrom and bent to embrace the terminal edge portion of the coils overlapped by the strip, one of said side walls having a recess formed therein corresponding to the contour of the other side wall so that one is received in the recess of the other when bent into position of use to embrace the opposite sides of the terminal coil portions overlapped by the strip.

2. A spring assembly as claimed in claim 1 in which the lugs extending perpendicular from an intermediate portion of the base through the openings in the tie rod with the through-extending portion bent to lie substantially parallel with the base and into engagement with the opposite wall of the tie rod.

3. A spring assembly as claimed in claim 1 in which the side walls extend in the same direction substantially perpendicularly from the edges of the base to embrace the overlapped coils therebetween with the end portions turned inwardly in the directions toward each other whereby the side wall portion of one fits within the cut out portion of the other for substantially flush engagement with the opposite side of the overlapped coils contained therebetween.

4. A spring assembly as claimed in claim 1 in which the tie rod is formed with a pair of longitudinally spaced openings between the lateral edges of the strip and in which the clips for securing the tie rods to the coil springs is formed with a pair of lugs extending from the base in longitudinally spaced apart relation corresponding to the spaced relation between the openings in the strip for passage therethrough in the assembled relation.

References Cited in the file of this patent

UNITED STATES PATENTS

| Number | Name | Date |
|---|---|---|
| 718,301 | Baker | Jan. 13, 1903 |
| 1,834,789 | Lodge | Dec. 1, 1931 |
| 1,948,754 | Gail | Feb. 27, 1934 |
| 2,170,618 | Roeske | Aug. 22, 1939 |
| 2,291,390 | Krakauer | July 28, 1942 |

FOREIGN PATENTS

| Number | Country | Date |
|---|---|---|
| 182,169 | Great Britain | June 22, 1922 |